United States Patent [19]

Ide

[11] 4,429,061
[45] Jan. 31, 1984

[54] HEAT TREATED HIGH PERFORMANCE FOAMS OF THERMOTROPIC LIQUID CRYSTAL POLYMERS

[75] Inventor: Yoshiaki Ide, North Plainfield, N.J.

[73] Assignee: Celanese Corporation, New York, N.Y.

[21] Appl. No.: 441,655

[22] Filed: Nov. 15, 1982

Related U.S. Application Data

[63] Continuation of Ser. No. 282,828, Jul. 13, 1981, abandoned.

[51] Int. Cl.³ .............................. C08J 9/08; C08J 9/10
[52] U.S. Cl. ...................................... 521/182; 264/54; 521/185; 521/918
[58] Field of Search ....................... 521/182, 185, 918

[56] References Cited

U.S. PATENT DOCUMENTS

| | | | |
|---|---|---|---|
| 4,161,470 | 7/1979 | Calundann | 260/40 R |
| 4,219,461 | 8/1980 | Calundann | 260/40 R |
| 4,224,264 | 9/1980 | Ort | 521/182 |
| 4,238,600 | 12/1980 | Jackson et al. | 528/191 |
| 4,256,624 | 3/1981 | Calundann | 260/40 R |

*Primary Examiner*—Morton Foelak
*Attorney, Agent, or Firm*—Burns, Doane, Swecker & Mathis

[57] ABSTRACT

High performance foams comprised of thermotropic liquid crystal polymers are provided. The lightweight rigid foams exhibit a combination of excellent properties including enhanced mechanical properties such as high strength to weight ratio, high flame and thermal stability, and excellent solvent resistance. The foams fabricated from such polymers have significantly reduced anisotropy compared to unfoamed polymers. The transverse mechanical properties are enhanced by foaming relative to the percentage density reduction due to the foaming. The physical properties of the foams are further enhanced by heat treatment as the core of foams of thermotropic liquid crystal polymers consists of highly oriented cell walls which can exhibit greater enhancement upon heat treatment than is exhibited by the core of the unfoamed polymer.

38 Claims, No Drawings

HEAT TREATED HIGH PERFORMANCE FOAMS OF THERMOTROPIC LIQUID CRYSTAL POLYMERS

CROSS-REFERENCE TO RELATED APPLICATION

This application is a continuation of application Ser. No. 282,828, filed July 13, 1981, now abandoned.

This application is related to application Serial No. 441,807, filed Nov. 15, 1982, of Yoshiaki Ide entitled "Lightweight High Performance Foams of Thermotropic Liquid Crystal Polymers Comprising Recurring 6-Oxy-2-Naphthoyl Moieties."

BACKGROUND OF THE INVENTION

The present invention provides high performance foams comprised of liquid crystal polymers. The foams of the present invention exhibit enhanced mechanical properties.

Foamed plastics are very useful in those applications where enhanced mechanical properties such as a high strength to weight ratio is desirable.

There are many applications for lightweight high performance foamed articles in transportation vehicles, building materials, industrial equipment and business machines, among others. However, no industry demands more lightweight, high performance products than the transportation industry. Particularly in the automobile industry, the principal applications involve structural elements as well as applications under the hood. The structural elements such as trunks, hoods and doors require high mechanical properties. The under the hood applications require excellent resistance to solvents as well as the ability to resist high temperatures.

However, when conventional isotropic polymers are foamed for use in such applications, the advantageous reduction in weight is unfortunately accompanied by a significant reduction in desirable mechanical properties such as tensile strength, impact strength and initial modulus. Thus, the range of applications of foamed conventional plastics is rather limited.

It is known in the art that unfoamed articles of liquid crystal polymers fabricated by conventional methods such as extrusion or injection molding have very high anisotropy of physical properties between the machine direction (MD) and the transverse direction (TD). This leads to very poor TD properties although the MD properties are very suitable. In addition, such articles have very distinct skin-core morphology along the cross section with the core being essentially unoriented.

It is also known that the highly aromatic liquid crystal polymers possess excellent high temperature stability and flame resistance as well as excellent solvent resistance and that foams of liquid crystal polymers may be provided. See U.S. Pat. Nos. 3,778,410; 3,804,805; 3,859,251; 3,890,256; 4,238,600; and published PCT application No. WO79/01030.

It is also known to those skilled in the art that the heat treatment of shaped articles of liquid crystal polymers increases its melting point, molecular weight and mechanical properties. See, for example, U.S. Pat. Nos. 3,975,487; 4,183,895; and 4,247,514.

OBJECTS AND SUMMARY OF THE INVENTION

It is therefore an object of the present invention to provide lightweight rigid foams which exhibit a combination of desirable properties such as high mechanical properties as well as thermal, flame and solvent resistance.

It is a further object of the present invention to provide improved shaped structural articles comprised of high performance foams.

It is a still further object of the present invention to provide an improved foam comprised of a thermotropic liquid crystal polymer.

It is a still further object of the present invention to provide an improved shaped structural article comprised of a foamed liquid crystal polymer which exhibits high tensile strength, initial modulus and impact strength.

It is still yet another object of the present invention to obviate the disadvantages of the prior art as discussed above.

Accordingly, in accordance with one aspect of the present invention, there is provided a method of producing a foam which exhibits good thermal, flame and solvent stability and desirable mechanical properties which is comprised of a rigid foamed wholly aromatic thermotropic liquid crystal polymer which comprises not less than about 10 mole percent of recurring units which include a naphthalene moiety which method includes subjecting said foam to a heat treatment sufficient to increase the melting temperature of the polymer at least 10 centigrade degrees.

In accordance with another aspect of the present invention, there is provided a foam which exhibits good thermal, flame and solvent stability and desirable mechanical properties which is comprised of a wholly aromatic thermotropic liquid crystal polymer comprised of not less than about 10 mole percent of recurring units which include a naphthalene moiety which foam has been subjected to a heat treatment for a period of time and at a temperature sufficient to increase the melting temperature of the polymer at least 10 centigrade degrees.

DETAILED DESCRIPTION OF THE INVENTION

Thermotropic liquid crystal polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Those thermotropic liquid crystal polymers suitable for use in the present invention are wholly aromatic polymers which are capable of forming an anisotropic melt phase and which comprise not less than about 10 mole percent of recurring units which include a naphthalene moiety. The aromatic polymers are considered to be "wholly" aromatic in the sense that each moiety present in the polymer contributes at least one aromatic ring to the polymer backbone.

As previously noted, the wholly aromatic thermotropic liquid crystal polymers employed in the foams of the present invention comprise not less than about 10 mole percent of recurring units which include a naphthalene moiety. Preferred naphthalene moieties include 6-oxy-2-naphthoyl, 2,6-dioxynaphthalene, and 2,6-dicarboxynaphthalene.

The thermotropic liquid crystal polymer may be further comprised of additional moieties which contribute at least one aromatic ring to the polymer backbone and which enable the polymer to exhibit anisotropic properties in the melt phase. Such moieties include but are not limited to aromatic diols, aromatic amines, aromatic diacids and aromatic hydroxy acids such as:

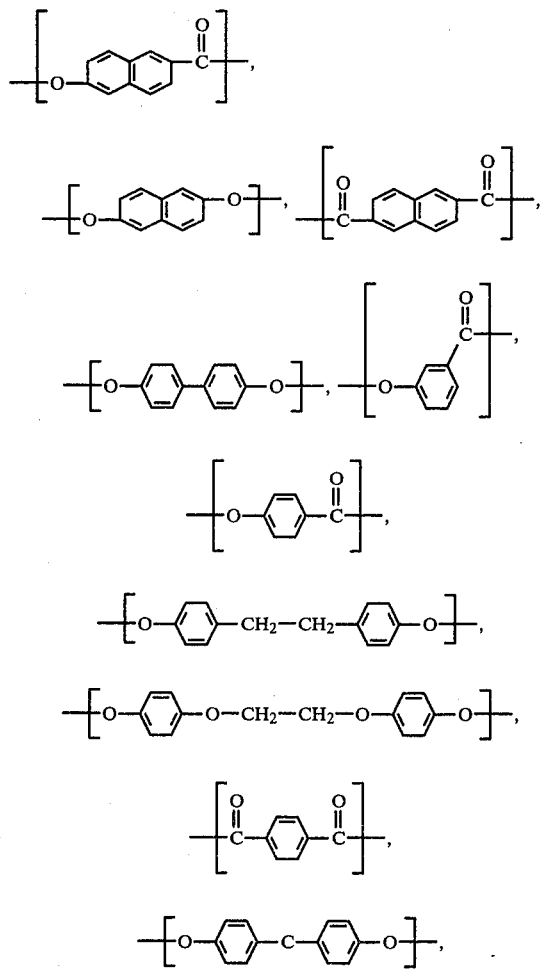

-continued

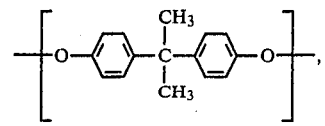

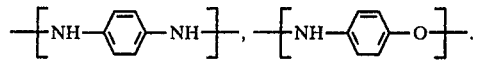

The respective moieties may be present in the various proportions. For example, the polymer comprises at least about 10 mole percent of recurring units which include a naphthalene moiety, preferably between about 10 to 90 mole percent, and more preferably, at least about 20 mole percent.

Wholly aromatic polymers which are preferred for use in the present invention and which satisfy the above characteristics include wholly aromatic polyesters and poly(ester-amide)s which are disclosed in commonly-assigned U.S. Pat. Nos. 4,067,852; 4,083,829; 4,130,545; 4,161,470; 4,184,996; 4,219,461 and 4,256,624; and in commonly-assigned U.S. application Ser. Nos. 91,003, filed Nov. 5, 1979, now Pat. No. 4,337,191, 128,778, filed Mar. 10, 1980, now Pat. No. 4,279,803, 128,759, filed Mar. 10, 1981, now U.S. Pat. No. 4,299,756, and 214,557, filed Dec. 9, 1980, now Pat. No. 4,330,457. The disclosures of all of the above-identified commonly-assigned U.S. patents and applications are herein incorporated by reference in their entirety. The wholly aromatic polyesters disclosed therein typically are capable of forming an anisotropic melt phase at a temperature below approximately 400° C., and preferably below approximately 350° C.

The wholly aromatic polymers including wholly aromatic polyesters and poly(ester-amide)s which are suitable for use in the present invention may be formed by a variety of esterforming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., BF₃), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble to a small degree (e.g., less than about 1 percent by weight) in pentafluorophenol.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5000 to 50,000 and preferably about 10,000 to 30,000; e.g., 15,000 to 17,000. Such molecular weight may be determined by gel permeation chromatography as well as by other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

Especially preferred wholly aromatic polymers are those which are disclosed in above-noted U.S. Pat. Nos. 4,161,470, 4,184,996, 4,219,461 and 4,256,624.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine, and bromine. Although bromine atoms tend to be released from organic compounds at high temperatures, bromine is more stable on aromatic rings than on aliphatic chains, and therefore is suitable for inclusion as a possible substituent on the aromatic rings.

The wholly aromatic polyester which is disclosed in U.S. Pat. No. 4,161,470 is a melt processable wholly aromatic polyester capable of forming an anisotropic melt phase at a temperature below approximately 350°

C. The polyester consists essentially of the recurring moieties I and II wherein:

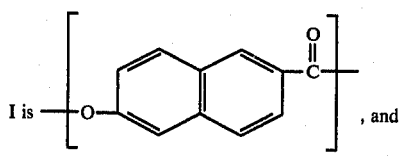

I is , and

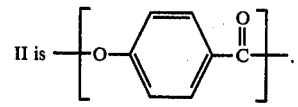

II is .

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II, and III wherein:

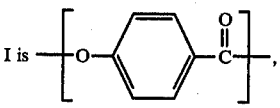

I is ,

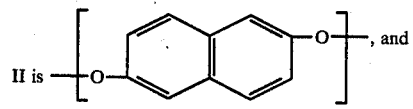

II is , and

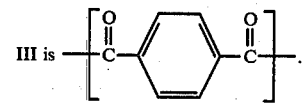

III is .

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III, and IV wherein:

I is 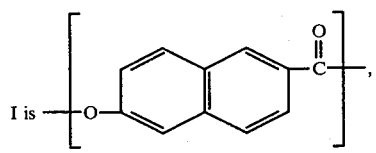

II is 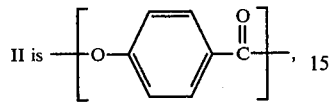

III is a dioxy aryl moiety of the formula ⁻⁅O-AR-O⁆⁻ wherein Ar is a divalent radical comprising at least one aromatic ring, and IV is a dicarboxy aryl moiety of the formula

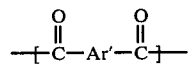

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

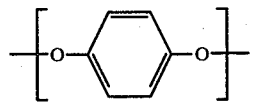

and the preferred dicarboxy aryl moiety IV is:

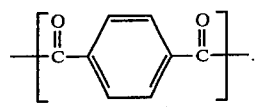

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:

I is 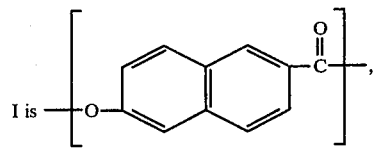

II is a dioxy aryl moiety of the formula ⁻⁅O-Ar-O⁆⁻ where Ar is a divalent radical comprising at least one aromatic ring, and III is a dicarboxy aryl moiety of the formula

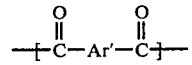

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

As with moieties III and IV of the polyester disclosed in U.S. Pat. No. 4,219,461, moieties II and III of the polyester described immediately above may be symmetrical or nonsymmetrical, but are preferably symmetrical.

Preferred moieties II and III are set forth in above-noted U.S. Pat. No. 4,256,624. The preferred dioxy aryl moiety II is:

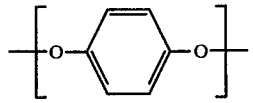

and the preferred dicarboxy aryl moiety III is:

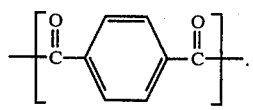

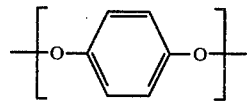

U.S. application Ser. No. 214,557, filed Dec. 9, 1980, discloses, among others, a melt processable wholly aromatic poly(ester-amide) which is capable of forming an anisotropic melt phase at a temperature below approximately 400° C. The wholly aromatic poly(ester-amide) consists essentially of the recurring moieties I, II, III and optionally IV wherein:

I is 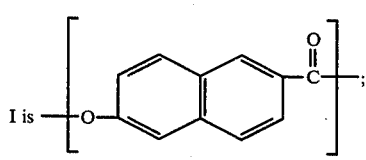

II is

where A is a divalent radical comprising at least one aromatic ring;

III is ⁺Y-Ar-Z⁺, where Ar is a divalent radical comprising at least one aromatic ring, Y is O, NH, or NR, and Z is NH or NR, where R is an alkyl group of 1 to 6 carbon atoms or an aryl group; and IV is ⁺O-Ar'-O⁺, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties II, III and IV are set forth in above-noted U.S. application Ser. No. 214,557. The preferred dicarboxy aryl moiety II is:

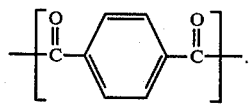

the preferred moiety III is:

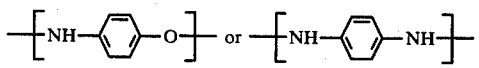

and the preferred dioxy aryl moiety IV is:

The foams of the present invention can be formed in any suitable conventional manner such as by extrusion, injection molding, etc. For example, a foam may be formed by screw extrusion by admixing pellets of a thermotropic liquid crystal polymer with a powdered blowing agent and extruding the admixture through an appropriate orifice (e.g., a slit die, etc.) at a temperature greater than the melting temperature of the polymer. The blowing agent decomposes at the temperature of extrusion to release a gas such as nitrogen or carbon dioxide within the extruded polymer melt to form the foam. The extruded foamed polymer is quenched or cooled by appropriate means such as by forced air.

The particular extrusion apparatus used is not critical and any suitable apparatus may be used herein. Examples of suitable extrusion apparatus are described in *Plastics Engineering Handbook of the Society of the Plastics Industry, Inc.*, Fourth Edition, edited by Joel Frados, Van Nostrand Reinhold Company (1976), pages 156-203.

The conditions of temperature and pressure under which the liquid crystal polymer can be extruded are not critical to the process of the present invention and can easily be determined by one of ordinary skill in the art. Typically, foamed thermotropic liquid crystal polymers can be extruded at a temperature within the range of approximately 250° C. to 350° C. (depending upon the melting temperature of the polymer) and at a pressure within the range of approximately 100 p.s.i. to 5,000 p.s.i.

The thermotropic liquid crystal polymers typically exhibit a density of about 0.1 to about 0.75 gram/cm$^3$ upon being foamed. Preferably, the density of the foamed polymer ranges from about 0.3 to about 0.75 gram/cm$^3$. In addition, the melting point of the foamed thermotropic liquid crystal polymer ranges from about 250° C. to about 320° C. depending upon the specific polymer employed.

The foamed liquid crystal polymers can be extruded to form a variety of structural articles. For example, the liquid crystal polymer can be extruded through a die to form a sheet. It is to be understood that the term "sheet" as used herein includes any of various relatively thin, substantially flat structures which may be known to the art as sheets or slabs, etc. The liquid crystal polymer can also be extruded through a suitable die to form a rod or tube (e.g., a pipe).

The foamed thermotropic liquid crystal polymers can also be employed to form molded structural articles such as by screw injection molding. An admixture of the blowing agent and the pelleted polymer are placed in the hopper of a screw injection molding apparatus wherein the admixture is heated to above the melting temperature of the polymer and injected into a suitable mold kept at a temperature substantially below the melting temperature of the polymer. The polymer is thereafter allowed to cool and separated from the mold. The conditions of temperature and pressure under which the liquid crystal polymer can be molded are not critical and can easily be determined by one of ordinary skill in the art.

Conventional high temperature blowing agents can be employed to produce the foamed polymers. For example, suitable blowing agents include but are not limited to those marketed commercially under the tradenames Expandex 5 PT (comprised of 5-phenyltetrazole and marketed by Stepan Chemical Co.), Ficel THT (comprised of trihydrazine triazine and marketed by Fisons Industrial Chemicals), Celogen HT 550 (comprised of a hydrazine drivative and marketed by Uniroyal Chemical) and Kemtec 500 (marketed by Sherwin-Williams Chemicals). Such blowing agents decompose at a temperature within the range of about 240° to 310° C.

The decomposition of the blowing agent is a function of temperature as well as time. It is important to match the decomposition temperature with the processing temperature of the polymer. It the blowing agent decomposes before the polymer melts sufficiently, poor cell structure may be attained as well as an unsatisfactory surface appearance. The amount of blowing agent required generally ranges between about 0.1 percent by weight to several percent depending upon the gas yield of the blowing agent and the desired density reduction. Preferably, the concentration of the blowing agent will range between about 0.2 and about 0.5 percent by weight.

In addition, with the proper selection of chemical blowing agent, the foaming action can be controlled by controlling the temperature and/or the pressure. Control of the foaming action by temperature is more reliable than pressure and the use of a chemical blowing agent is thus preferred.

It is also possible that a suitable gas could be blown into the polymer melt to provide the foamed polymer. However, it is more difficult to ensure adequate dispersion of the gas by such a method.

Various fillers and reinforcing agents may also be employed to enhance various characteristics of the foamed polymer. For example, suitable reinforcing agents such as glass fibers may be employed to provide reinforcement for the foam. Such reinforcing agents generally may be employed in an amount up to about 50 percent by weight and preferably from about 10 to about 50 percent by weight based on the weight of the foam. In addition, fillers such as pigments, antioxidants and nucleating agents may be added. The amount of such fillers which are generally employed ranges approximately from 0.2 to 10 percent by weight and preferably ranges from about 0.5 to about 2 percent by weight.

The foams of the present invention exhibit enhanced mechanical properties due to the orientation of the polymer molecules and the effect of heat treatment. Specifically, the foams exhibit a reduced directional anisotropy in comparison to the unfoamed polymer. Foams having such a reduced directional anisotropy are self-reinforcing and have mechanical properties comparable to those of fiber-reinforced polymeric materials. The orientation of the polymer molecules around the closed cell bubbles is caused by the biaxial elongational flow field of expanding bubbles during the foaming process. The rod-like molecules of liquid crystal polymers can be easily oriented by such a flow field and the biaxial orientation can be retained.

As a result of this reduced directional anisotropy, the foams exhibit enhanced mechanical properties relative to the weight of the foam measured in the transverse direction (TD) in relation to the mechanical properties measured in the machine direction (MD).

The mechanical properties of foams produced in accordance with the present invention can be improved still further by subjecting the foams to a heat treatment following formation thereof. The heat treatment improves the properties of the foam by increasing the molecular weight of the liquid crystalline polymer and increasing the degree of crystallinity thereof while also increasing the melting temperature of the polymer.

The foams may be thermally treated in an inert atmosphere (e.g., nitrogen, carbon dioxide, argon, helium) or alternatively, in a flowing oxygen-containing atmosphere (e.g., air). The use of a non-oxidizing atmosphere is preferred to avoid the possibility of thermal degradation. For instance, the foam may be brought to a temperature approximately 10 to 30 centigrade degrees below the melting temperature of the foamed liquid crystal polymer, at which temperature the foam remains a solid object. It is preferable for the temperature of the heat treatment to be as high as possible without equaling or exceeding the melting temperature of the polymer. It is most preferable to gradually increase the temperature of heat treatment in accordance with the increase of the melting temperature of the polymer during heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since higher heat treatment temperatures can be applied without melting the polymer.

Preferably, the heat treatment is conducted under conditions sufficient to increase the melting temperature of the polymer at least 10 centigrade degrees. Most preferably, the melting temperature of the foamed liquid crystal polymer is increased from between about 20 to about 50 centigrade degrees as a result of the heat treatment. The amount of increase which is obtained is dependent upon the temperature used in the heat treatment, with higher heat treatment temperatures giving greater increases. It should be noted at this time that reference herein to a temperature below which a specific polymer may exhibit anisotropic properties in the melt phase is intended to refer to the temperature below which the polymer exhibits such properties prior to heat treatment thereof.

It has also been found that while the heat treatment of non-foamed liquid crystal polymers increases the molecular weight of the polymer and the melting temperature thereof, a greater increase in the melting temperature and molecular weight of the polymer can be obtained if the polymer is foamed prior to such heat treatment.

Such increase is evidenced by a higher melting temperature in the core of the foam, with the foam basically being comprised of a skin and a core. The skin of the foam is a thin layer (e.g., a few mils thick) consisting of the polymer which possesses a significantly greater density than that exibited by the core. The core comprises substantially the entire volume of the foam (except for the skin) and is of much lower density than the skin. The skin is produced during the extrusion or injection molding processes as a result of the flow pattern of the foamed polymer and the influence of shear forces, etc. The thickness of the skin is also related to cooling rates and injection speed, with higher cooling rates and lower injection molding speeds providing a thicker skin.

It is believed that the foamed liquid crystal polymers have higher levels of local orientation around the bubbles which facilitates further polymerization reaction between chain ends. In addition, by-products of such reaction can diffuse out more easily through the foam.

In addition, the fact that further polymerization is facilitated results in the production of a foamed polymer which exhibits more balanced mechanical properties (i.e., the difference between the tensile strength (TD) and the tensile strength (MD) is reduced) such that the foam is, in effect, proportionally stronger in the transverse direction.

The chemical resistance also increases with heat treatment and the solubility into pentafluorophenol, one of the rare solvents for thermotropic liquid crystal polymers, continuously decreases with increasing heat treatment time and eventually the material does not dissolve even minimally (such as in amounts of 0.1 present by weight). Accordingly, reference herein to solvation of the thermotropic liquid crystal polymers is intended to refer to such solvation prior to heat treatment of the foam.

The invention is additionally illustrated in connection with the following Examples which are to be considered as illustrative of the present invention. It should understood, however, that the invention is not limited to the specific details of the Examples.

EXAMPLE 1

Pellets of a thermotropic liquid crystal polymer comprised of 60 mole percent of p-oxybenzoyl units, 20 mole percent of 2,6-dioxynaphthoyl units and 20 mole percent of terephthoyl units and having an inherent viscosity of 5.4 are screw extruded at 300° C. through a 4 inch Killion die to provide several foamed and unfoamed sheet samples. A Ficel THT powdered blowing agent (0.5 percent by weight) admixed with 0.1 percent by weight of mineral oil is used to form the foamed samples by admixture with the pellets prior to extrusion. The density of the unfoamed samples is 1.4 grams/cc based on the average of five samples. The density of the foamed samples is reduced to 0.58 grams/cc which constitutes a 59 percent weight reduction. All samples exhibit a melting temperature of 295° C. Certain of the samples are heat treated at 280° C. for 24 hours followed by additional heat treatment at 310° C. for 24 hours whereupon the melting temperature is increased to 341° C. All samples are examined to determine their tensile properties along both the machine (MD) and transverse (TD) directions subsequent to extrusion and heat treatment according to ASTM D638, Type V. The results of such examination are set forth in Tables I and II below:

TABLE I

Tensile Properties of Extruded Unfoamed Example I Sheets

| Sample | Tensile Properties (MD) | | | Tensile Properties (TD) | | |
|---|---|---|---|---|---|---|
| | Tensile Strength ($10^3$ psi) | Elongation (%) | Initial Modulus ($10^6$ psi) | Tensile Strength ($10^3$ psi) | Elongation (%) | Initial Modulus ($10^6$ psi) |
| 1 (As extruded) | 38.9 | 1.07 | 4.19 | 7.94 | 5.61 | 0.450 |
| 2 (After heat treatment) | 74.1 | 2.04 | 3.64 | 8.94 | 7.26 | 0.438 |
| 3 (As extruded) | 34.2 | 1.07 | 3.76 | 7.94 | 3.31 | 0.528 |
| 4 (After heat treatment) | 85.3 | 2.16 | 3.88 | 11.2 | 5.21 | 0.629 |
| 5 (As extruded) | 38.7 | 1.20 | 4.15 | 7.81 | 3.98 | 0.441 |
| 6 (After heat treatment) | 73.5 | 1.83 | 4.47 | 5.29 | 10.4 | 0.279 |

TABLE II

Tensile Properties of Extruded Foamed Example 1 Sheets

| Sample | Tensile Properties (MD) | | | Tensile Properties (TD) | | |
|---|---|---|---|---|---|---|
| | Tensile Strength ($10^3$ psi) | Elongation (%) | Initial Modulus ($10^6$ psi) | Tensile Strength ($10^3$ psi) | Elongation (%) | Initial Modulus ($10^6$ psi) |
| 7 (As extruded) | 7.60 | 1.59 | 0.747 | 4.82 | 2.45 | 0.446 |
| 7a | 18.3 | 1.59 | 1.80 | 11.6 | 2.45 | 1.07 |
| 8 (After heat treatment) | 14.7 | 2.60 | 0.860 | 7.46 | 3.48 | 0.499 |

TABLE II-continued

Tensile Properties of Extruded Foamed Example 1 Sheets

| Sample | Tensile Properties (MD) | | | Tensile Properties (TD) | | |
|---|---|---|---|---|---|---|
| | Tensile Strength ($10^3$ psi) | Elongation (%) | Initial Modulus ($10^6$ psi) | Tensile Strength ($10^3$ psi) | Elongation (%) | Initial Modulus ($10^6$ psi) |
| 8a | 35.4 | 2.60 | 2.07 | 17.9 | 3.48 | 1.20 |

Samples 7a and 8a represent Samples 7 and 8 corrected to a density of 1.4 grams/cc (i.e., density of unfoamed samples).

As shown in Example 1, heat treatment of the thermotropic liquid crystal polymer foam provides distinct advantages. Specifically, the tensile strength, elongation and initial modulus exhibited by the foamed polymer are all increased significantly as a result of the heat treatment.

Example 1 also demonstrates that the heat treated foams of the present invention exhibit enhanced mechanical properties (relative to the weight of the foam) in the transverse direction (TD) in relation to the mechanical properties measured in the machine direction. For example, when corrected for density reduction, the tensile strength (TD) of the foamed polymer exceeds the tensile strength (TD) of the unfoamed polymers. More importantly, while the unfoamed polymers exhibit minor increases in tensile strength (TD) upon being heat treated, the foamed polymer exhibits a dramatic 65 percent increase in tensile strength (TD) upon being heat treated. Such a result renders such heat treated foamed polymers highly desirable in structural applications where low weight requirements exist since desirable tensile properties in both the transverse and machine direction can still be provided.

EXAMPLE 2

The thermotropic liquid crystal polymer of Example 1 is admixed with 0.2 weight percent of a blowing agent denoted as Kemtec 500 and 1 weight percent of the inorganic filler wollastonite (a nucreating agent). The admixture is screw extruded through a sheet die to provide both foamed and unfoamed sheet samples. The density of the foamed sample is 0.61 gram/cc. Certain of the samples are also heat treated with the temperature programmed to increase continuously. Specifically, after the samples are dried at 130° C. for 12 hours, the temperature is increased to 260° C. over 4 hours and then to 310° C. over 20 hours. Melting behaviors of the samples at the skin and at the core are measured by a differential scanning colorimeter subsequent to extrusion and heat treatment. The melting peak before heat treatment is 295° C. for both unfoamed and foamed samples regardless of skin or core. The increase of the melting point after heat treatment differs as set forth in Table III below:

TABLE III

Melting Peaks of the Skin and Core after Heat Treatment

| | Unfoamed | Foamed |
|---|---|---|
| Skin | 330° C. | 328° C. |
| Core | 321° C. | 327° C. |

One of the most striking advantages which is attained by heat treatment of the foams of the present invention is demonstrated by Example 2 and shown by the data in Table III. The effect of the heat treatment depends on molecular orientation; i.e., the more oriented, the greater the effect. As shown in Table III, the melting temperature increase of the core after heat treatment is greater for the foamed than for the unfoamed articles. This indicates that the orientation of the foam is rather uniform throughout the cross-section and the level of orientation is very high and very close to that of the unfoamed skin.

While the skin of the unfoamed polymer exhibits a greater melting peak increase than does the skin of the foamed polymer, the lower increase in the melting peak of the foamed skin is not a disadvantage due to the fact that the skin volume comprises a relatively small proportion of the total foam volume.

EXAMPLE 3

Pellets of a thermotropic liquid crystal polymer comprised of 75 mole percent of p-oxybenzoyl moieties and 25 mole percent of 6-oxy-2-naphthoyl moieties and having an inherent viscosity of 9.9 are screw extended through a 4 inch Killion die to provide both foamed and unfoamed sheet samples. A Celogen HT 550 (0.1 percent by weight) and Kemtee 500 (0.2 percent by weight) blowing agent are used to form the foamed samples by admixture with the pellets prior to extrusion. All samples (foamed and unfoamed) exhibit a melting temperature of 301° C.

Both foamed and unfoamed samples are subjected to heat treatment wherein the temperature is increased from 130° C. to 260°. over a one hour period and then increased to 310° C. over an eleven hour period. The melting temperatures of the skin and core of the foamed and unfoamed samples are measured with the results tabulated in Table IV below:

TABLE IV

Melting Temperatures of Foamed and Unfoamed Heat Treated Sheets of Example 3

| Sample | Skin | Core |
|---|---|---|
| 1 (Unfoamed) | 334° C. | 332° C. |
| 2 (Unfoamed) | 338° C. | 334° C. |
| 3 (Foamed)[a] | 342° C. | 342° C. |
| 4 (Foamed)[b] | 341° C. | 338° C. |

[a] 0.1 percent Celogen HT550, foam density = 0.52 grams/cm$^3$
[b] 0.2 percent Kemtec 500, foam density = 0.75 grams/cm$^3$ As indicated previously in Example 2, the melting temperature of the core of the foamed sheets can be increased to a greater extent than is the melting temperature of the core of the unfoamed sheets, thus demonstrating that the foamed polymer is more amenable to heat treatment than the unfoamed polymer.

The principles, preferred embodiments and modes of operation of the present invention have been described in the foregoing specification. The invention which is intended to be protected herein, however, is not to be construed as limited to the particular forms disclosed, since there are to be regarded as illustrative rather than restrictive. Variations and changes may be made by those skilled in the art without departing from the spirit of the invention.

I claim:

1. A thermotropic liquid crystal polymer foam which exhibits good thermal stability, flame and solvent resistance and desirable mechanical properties such as high strength comprising a rigid foamed wholly aromatic polyester which exhibits anisotropic properties in the melt phase and consists of monomers having chain extending linkages that are either coaxial or parallel and which comprises not less than about 10 mole percent of recurring units which include a naphthalene moiety and which has been subjected to a heat treatment at a temperature below the melting temperature of the polymer and for a time sufficient to increase the melting temperature of the polymer at least 10 centigrade degrees.

2. The foam of claim 1 wherein said wholly aromatic polyester exhibits an inherent viscosity of at least 2.0 dl./g. when dissolved in a concentration of 0.1 percent by weight in pentafluorophenol at 60° C. prior to said heat treatment.

3. The foam of claim 1 wherein said naphthalene moiety of said wholly aromatic polyester is selected from the group consisting of a 6-oxy-2-naphthoyl moiety, a 2,6-dioxynaphthalene moiety, and a 2,6-dicarboxynaphthalene moiety.

4. The foam of claim 1 wherein said wholly aromatic polyester is capable of forming an anisotropic melt phase at a temperature below approximately 400° C. prior to said heat treatment.

5. The foam of claim 1 wherein said wholly aromatic polymer comprises a melt processable wholly aromatic polyester which is capable of forming an anisotropic melt phase and consists essentially of the recurring moieties I, II, and III wherein:

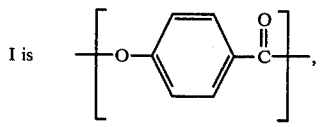

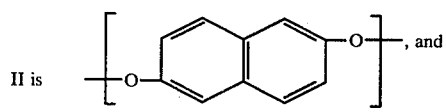, and

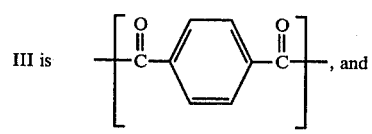, and wherein said polyester comprises approximately 30 to 70 mole percent of moiety I and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

6. The foam of claim 1 wherein said wholly aromatic polyester comprises a melt processable wholly aromatic polyester which is capable of forming an anisotropic melt phase and consists essentially of the recurring moieties I and II wherein:

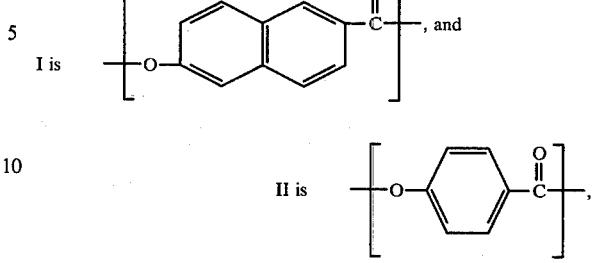

wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

7. The foam of claim 1 wherein said wholly aromatic polyester comprises a melt processable wholly aromatic polyester which is capable of forming an anisotropic melt phase and consists essentially of the recurring moieties I, II, and III wherein:

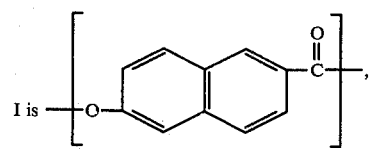

II is a dioxy aryl moiety of the formula $+O-Ar-O+$ where Ar is a divalent radical comprising at least one aromatic ring, and III is a dicarboxy aryl moiety of the formula

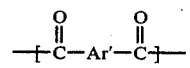

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixture thereof.

8. The foam of claim 1 wherein said wholly aromatic polyester comprises a melt processable wholly aromatic polyester which is capable of forming an anisotropic melt phase and consists essentially of the recurring moieties I, II, III and IV wherein:

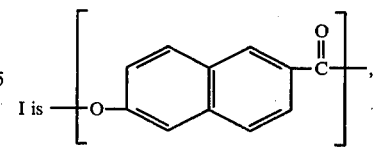

II is 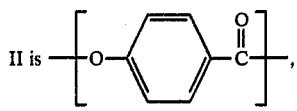

III is a dioxy aryl moiety of the formula ⁺O—Ar—O⁺ wherein Ar is a divalent radical comprising at least one aromatic ring, and IV is a dicarboxy aryl moiety of the formula

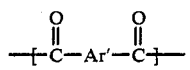

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

9. The foam of claim 1 wherein said wholly aromatic polyester comprises a melt processable wholly aromatic poly(ester-amide) which is capable of forming an anisotropic melt phase and consists essentially of the recurring moieties I, II, III and optionally IV wherein:

I is 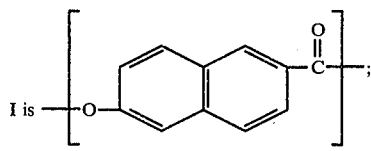

II is

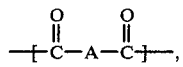

where A is a divalent radical comprising at least one aromatic ring;

III is ⁺Y—Ar—Z⁺, where Ar is a divalent radical comprising at least one aromatic ring, Y is O, NH, or NR, and Z is NH or NR, where R is an alkyl group of 1 to 6 carbon atoms or an aryl group; and IV is ⁺O—Ar'—O⁺, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

10. The foam of claim 1 wherein said foam is in the form of a sheet.

11. The foam of claim 1 wherein said foam is in the form of a tube.

12. The foam of claim 1 wherein said foamed polymer includes a reinforcing agent.

13. The foam of claim 12 wherein said reinforcing agent comprises fibers.

14. The foam of claim 1 wherein said foam has been subjected to a heat treatment for a period of time and at a temperature sufficient to increase the melting temperature of the polymer between about 20 and 50 centigrade degrees.

15. The foam of claim 14 wherein said heat treatment temperature ranges from about 10 to about 30 centigrade degrees below the melting temperature of the polymer.

16. The foam of claim 14 wherein said period of time ranges from about 0.5 to about 200 hours.

17. The foam of claim 1 wherein the density of said foam ranges from about 0.1 to about 0.75 gram/cm$^3$.

18. The foam of claim 1 wherein said heat treatment occurs in a non-oxidizing atmosphere.

19. The foam of claim 18 wherein said heat treatment occurs in a nitrogen atmosphere.

20. A method of providing a thermotropic liquid crystal polymer foam which exhibits good thermal stability, flame and solvent resistance and desirable mechanical properties such as high strength comprising the steps of providing a rigid foamed wholly aromatic polyester which exhibits anisotropic properties in the melt phase and consists of monomers having chain extending linkages that are either coaxial or parallel and which comprises not less than about 10 mole percent of recurring units which include a naphthalene moiety and subjecting said foam to a heat treatment at a temperature below the melting temperature of the polymer and for a time sufficient to increase the melting temperature of the polymer at least 10 centigrade degrees.

21. The method of claim 20 wherein said wholly aromatic polyester exhibits an inherent viscosity of at least 2.0 dl./g when dissolved in a concentration of 0.1 percent by weight in pentafluorophenol at 60° C. prior to said heat treatment.

22. The method of claim 20 wherein said naphthalene moiety of said wholly aromatic polyester is selected from the group consisting of a 6-oxy-2-naphthoyl moiety, a 2,6-dioxynaphthalene moiety, and a 2,6-dicarboxynaphthalene moiety.

23. The method of claim 20 wherein said wholly aromatic polyester is capable of forming an anisotropic melt phase at a temperature below approximately 400° C. prior to said heat treatment.

24. The method of claim 20 wherein said wholly aromatic polyester comprises a melt processable wholly aromatic polyester which is capable of forming an anisotropic melt phase and consists essentially of the recurring moieties I, II and III wherein I is 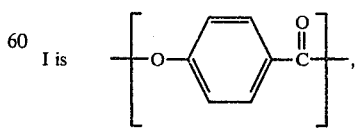

II is 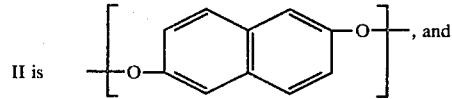

-continued

III is 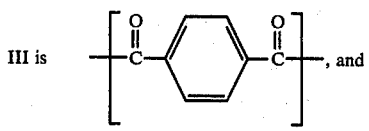, and wherein said polyester comprises approximately 30 to 70 mole percent of moiety I and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

25. The method of claim 20 wherein said wholly aromatic polyester comprises a melt processable wholly aromatic polyester which is capable of forming an anisotropic melt phase and consists essentially of the recurring moieties I and II wherein:

I is 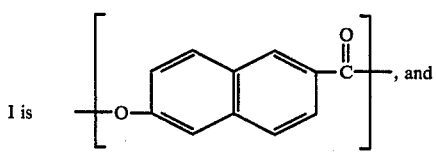, and

II is 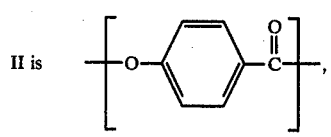, wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

26. The method of claim 20 wherein said wholly aromatic polyester comprises a melt processable wholly aromatic polyester which is capable of forming an anisotropic melt phase and consists essentially of the recurring moieties I, II, and III wherein:

I is 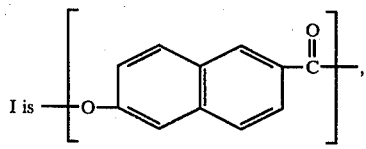,

II is a dioxy aryl moiety of the formula ─ɫO─Ar─O⅃─ where Ar is a divalent radical comprising at least one aromatic ring, and
III is a dicarboxy aryl moiety of the formula

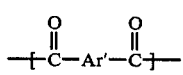

where Ar' is a divalent radical comprising at least one aromatic ring, and
wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixture thereof.

27. The method of claim 20 wherein said wholly aromatic polyester comprises a melt processable wholly aromatic polyester which is capable of forming an anisotropic melt phase and consists essentially of the recurring moieties I, II, III and IV wherein:

I is 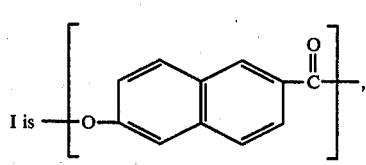,

II is 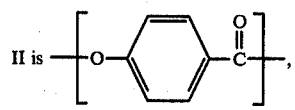,

III is a dioxy aryl moiety of the formula ─ɫO─Ar─O⅃─ wherein Ar is a divalent radical comprising at least one aromatic ring, and
IV is a dicarboxy aryl moiety of the formula

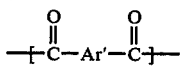

where Ar' is a divalent radical comprising at least one aromatic ring, and
wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

28. The method of claim 20 wherein said wholly aromatic polyester comprises a melt processable wholly aromatic poly(ester-amide) which is capable of forming an anisotropic melt phase and consists essentially of the recurring moieties I, II, III and optionally IV wherein:

I is 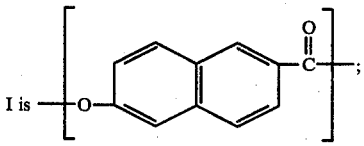;

II is

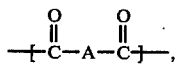, where A is a divalent radical comprising at least one aromatic ring;

III is $\mathrm{\text{\textemdash}(Y\text{\textemdash}Ar\text{\textemdash}Z)\text{\textemdash}}$, where Ar is a divalent radical comprising at least one aromatic ring Y is O, NH, or NR, and Z is NH or NR, where R is an alkyl group of 1 to 6 carbon atoms or an aryl group; and IV is $\mathrm{\text{\textemdash}(O\text{\textemdash}Ar'\text{\textemdash}O)\text{\textemdash}}$, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

29. The method of claim 20 wherein said foam is in the form of a sheet.

30. The method of claim 20 wherein said foam is in the form of a tube.

31. The method of claim 20 wherein said foamed polymer includes a reinforcing agent.

32. The method of claim 31 wherein said reinforcing agent comprises fibers.

33. The method of claim 20 wherein said foam is subjected to a heat treatment for a period of time and at a temperature sufficient to increase the melting temperature of the polymer between about 20 and 50 centigrade degrees.

34. The method of claim 33 wherein said heat treatment temperature ranges from about 10 to about 30 centigrade degrees below the melting temperature of the polymer.

35. The method of claim 33 wherein said period of time ranges from about 0.5 to about 200 hours.

36. The method of claim 20 wherein the density of said foam ranges from about 0.1 to about 0.75 gram/cm$^3$.

37. The method of claim 20 wherein said heat treatment occurs in a non-oxidizing atmosphere.

38. The method of claim 37 wherein said heat treatment occurs in a nitrogen atmosphere.

* * * * *